United States Patent
Chiba

(10) Patent No.: US 7,907,208 B2
(45) Date of Patent: Mar. 15, 2011

(54) INFORMATION PROCESSING SYSTEM, INFORMATION PROCESSING APPARATUS, AND INFORMATION PROCESSING METHOD FOR SIGNAL CONVERSION

(75) Inventor: Hiroaki Chiba, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/541,019

(22) Filed: Aug. 13, 2009

(65) Prior Publication Data
US 2010/0134681 A1    Jun. 3, 2010

(30) Foreign Application Priority Data

Dec. 1, 2008 (JP) .................................. 2008-306751

(51) Int. Cl.
*H04N 7/01*     (2006.01)
*G06F 13/12*    (2006.01)

(52) U.S. Cl. ........ 348/441; 348/445; 348/554; 348/555; 348/691; 348/694; 348/695; 348/696; 710/62; 710/63; 710/65; 710/72; 710/305; 710/316; 345/501; 345/531

(58) Field of Classification Search ............... 348/441
See application file for complete search history.

(56) References Cited

U.S. PATENT DOCUMENTS

| | | | | |
|---|---|---|---|---|
| 4,344,021 A * | 8/1982 | Johnston | ...................... | 315/383 |
| 5,229,852 A * | 7/1993 | Maietta et al. | ................ | 348/441 |
| 5,327,243 A * | 7/1994 | Maietta et al. | ................ | 348/565 |
| 5,561,472 A * | 10/1996 | Maietta et al. | ................ | 348/565 |
| 5,798,802 A * | 8/1998 | Elmis et al. | .................... | 348/689 |
| 6,091,429 A * | 7/2000 | Yassaie et al. | ................ | 345/546 |
| 6,104,414 A * | 8/2000 | Odryna et al. | ................ | 345/536 |
| 6,215,465 B1 * | 4/2001 | Asakura et al. | ................. | 345/87 |
| 6,314,479 B1 * | 11/2001 | Frederick et al. | ................ | 710/63 |
| 6,501,508 B1 * | 12/2002 | Song et al. | .................... | 348/441 |
| 6,873,307 B2 | 3/2005 | Nitta et al. | ..................... | 345/3.1 |

(Continued)

FOREIGN PATENT DOCUMENTS

| | | | |
|---|---|---|---|
| JP | 11143598 A | * | 5/1999 |
| JP | 2000181591 A | * | 6/2000 |
| JP | 2001-125693 | | 5/2001 |
| JP | 2001-175230 | | 6/2001 |
| JP | 2004-271987 | | 9/2004 |
| JP | 2004-357029 A | | 12/2004 |
| JP | 2005-091795 | | 7/2005 |
| JP | 2007-179225 A | | 7/2007 |
| JP | 2007-280355 | | 10/2007 |
| JP | 2008-003318 | | 10/2008 |

OTHER PUBLICATIONS

DisplayPort Standard, Version 1.1, Vesa, Mllpitas, CA, Mar. 19, 2009.

*Primary Examiner* — Henry W Tsai
*Assistant Examiner* — Steven G Snyder
(74) *Attorney, Agent, or Firm* — Blakely, Sokoloff, Taylor & Zafman LLP

(57) ABSTRACT

According to an aspect of the invention, an information processing apparatus configured to be connected to a conversion adaptor having a video input connector and a video output connector, the apparatus including: a video output port complying with the first standard for connection of the video input connector; an image processing module configured to output a first signal when the video input connector is not connected to the video output port, the image processing module being configured to output a second signal when the video input connector is connected to the video output port; and a bias module connected to the video output port and the image processing module and configured to output a third signal to the video output port, the bias module being configured to change physical layer information of the first signal or the second signal.

18 Claims, 12 Drawing Sheets

U.S. PATENT DOCUMENTS

| | | | |
|---|---|---|---|
| 7,411,568 B2 | 8/2008 | Kizaki | 345/2.2 |
| 7,563,129 B2 | 7/2009 | Chen | 439/498 |
| 7,791,609 B2* | 9/2010 | Lee | 345/531 |
| 2001/0004257 A1 | 6/2001 | Nitta et al. | 345/211 |
| 2004/0049797 A1* | 3/2004 | Salmonsen | 725/132 |
| 2004/0178968 A1 | 9/2004 | Kizaki | 345/2.2 |
| 2004/0239816 A1 | 12/2004 | Ando | 348/705 |
| 2005/0128217 A1* | 6/2005 | Cohen | 345/603 |
| 2005/0219415 A1* | 10/2005 | Young et al. | 348/554 |
| 2007/0171230 A1 | 7/2007 | Iwase et al. | 345/519 |
| 2007/0260785 A1 | 11/2007 | Chen | 710/62 |
| 2008/0100742 A1* | 5/2008 | Mogre et al. | 348/445 |
| 2009/0061675 A1 | 3/2009 | Chen | 439/448 |
| 2009/0079686 A1* | 3/2009 | Herz et al. | 345/100 |
| 2009/0079687 A1* | 3/2009 | Herz et al. | 345/100 |

* cited by examiner

US 7,907,208 B2

INFORMATION PROCESSING SYSTEM, INFORMATION PROCESSING APPARATUS, AND INFORMATION PROCESSING METHOD FOR SIGNAL CONVERSION

CROSS-REFERENCE TO RELATED APPLICATIONS

This application is based upon and claims the benefit of priority from Japanese Patent Application No. 2008-306751, filed Dec. 1, 2008, the entire contents of which are incorporated herein by reference.

BACKGROUND

1. Field

The present invention relates to an information processing system, an information processing apparatus, and an information processing method which use a video terminal conversion adaptor.

2. Description of the Related Art

Conventionally, various techniques for controlling, according to the manner of use of a user, a video signal that is generated by a information processing apparatus such as a personal computer have been proposed (refer to JP-A-2007-179225 and "VESA DisplayPort Interoperability Guideline Version 1.1", edited by Video Electronics Standards Association (VESA), Jan. 28, 2008, for example).

The information processing apparatus disclosed in JP-A-2007-179225 is configured so as to be able to use plural graphics chips and processes a video signal using an optimum graphics chip according to the use of the user.

The document "VESA DisplayPort Interoperability Guideline Version 1.1" has a disclosure as to a video terminal conversion adaptor (hereinafter referred to as a conversion adaptor) for connecting video terminals that comply with different standards. In particular, it describes specifications that are recommended for an adaptor for a DisplayPort (hereinafter abbreviated as DP) terminal and an HDMI (high-definition multimedia interface) terminal and an adaptor for a DP terminal and a DVI (digital visual interface) terminal. The conversion adaptors disclosed in this Non-patent document make it possible to easily connect an information processing apparatus having a DP terminal as a video output terminal to an information processing apparatus having an HDMI terminal or a DVI terminal as a video input terminal.

The DP signal is different from the HDMI signal and the DVI signal in bias voltage (physical layer information). To adjust the difference in bias voltage, the conversion adaptors disclosed in the document "VESA DisplayPort Interoperability Guideline Version 1.1" is equipped, in themselves, with an integrated circuit (level shift IC) for adjusting a voltage. ICs are smaller in signal variation and are less affected by variations in performance of components than circuits that are combinations of discrete components. Conversion adaptors incorporating this type of IC can accommodate differences between individual information processing apparatus through control by the IC and hence are high in versatility.

However, in the conversion adaptors disclosed in the document "VESA DisplayPort Interoperability Guideline Version 1.1", no consideration is given to a case that the internal configuration of an information processing apparatus is known. Where the internal configuration of an information processing apparatus is known, the use of this kind of IC only for voltage adjustment is too redundant.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
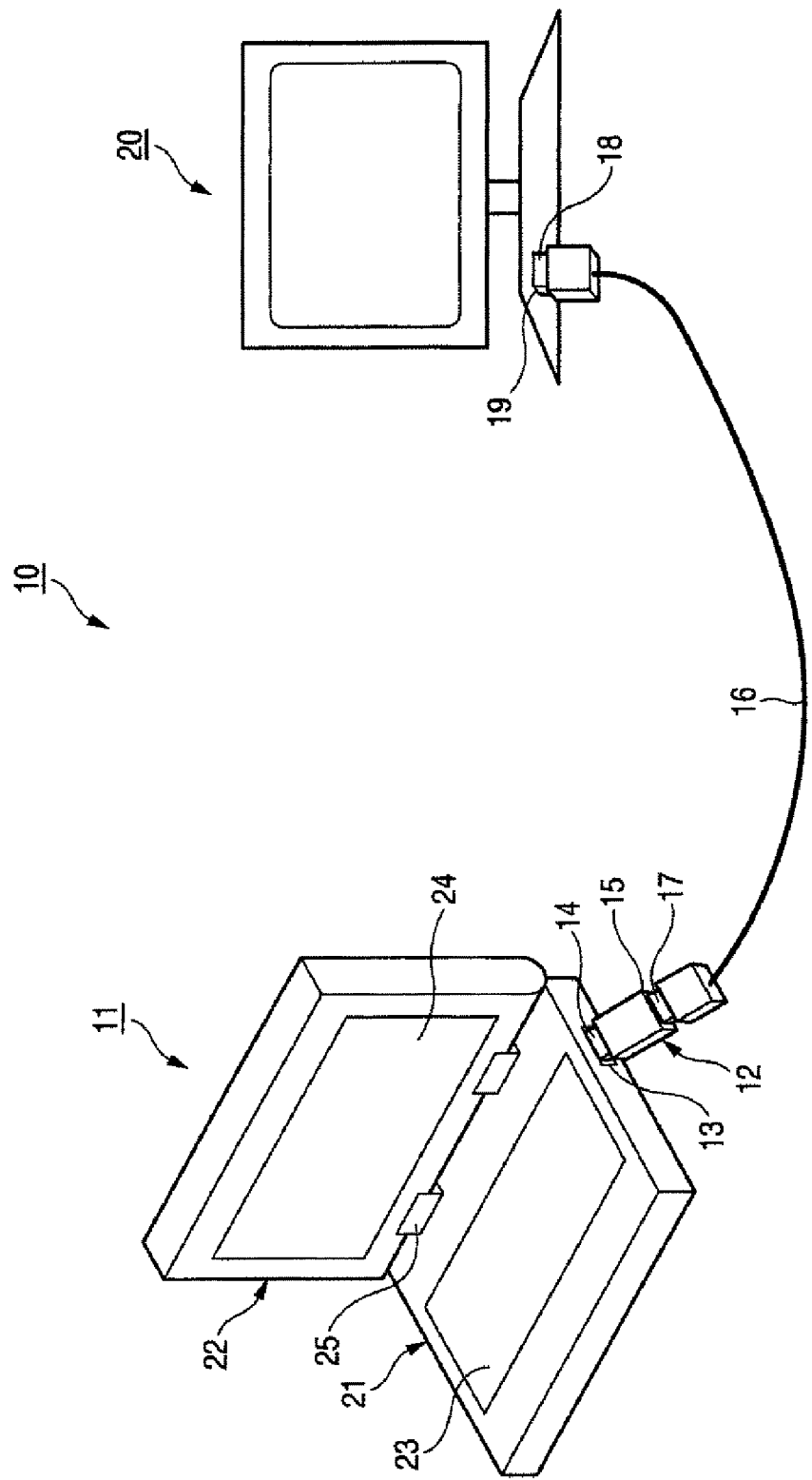
FIG. 1 shows a schematic appearance of an information processing system according to a first embodiment.

Various embodiments according to the invention will be described hereinafter with reference to the accompanying drawings. In general, according to one embodiment of the invention, an information processing apparatus configured to be connected to a conversion adaptor having a video input connector that complies with a first standard and a video output connector that complies with a second standard, the apparatus includes: a video output port complying with the first standard for connection of the video input connector; an image processing module configured to output a first signal that complies with a logical layer of the first standard when the video input connector is not connected to the video output port, the image processing module being configured to output a second signal that complies with a logical layer of the second standard when the video input connector is connected to the video output port; and a bias module connected to the video output port and the image processing module and configured to output a third signal to the video output port, the bias module being configured to change physical layer information of the first signal or the second signal.

In general, according to another embodiment of the invention, an information processing system includes: a conversion adaptor having a video input connector that complies with a first standard and a video output connector that complies with a second standard; and an information processing apparatus configured to be connected to the conversion adaptor, the apparatus including: a video output port complying with the first standard for connection of the video input connector; an image processing module configured to output a first signal that complies with a logical layer of the first standard when the video input connector is not connected to the video output port, the image processing module being configured to output a second signal that complies with a logical layer of the second standard when the video input connector is connected to the video output port; and a bias module connected to the video output port and the image processing module and configured to output a third signal to the video output port, the bias nodule being configured to change physical layer information of the first signal or the second signal.

In general, according to another embodiment of the invention, an information processing method for an information processing apparatus including a video output port that complies with a first standard and to which a conversion adaptor having a video input connector that complies with the first standard and a video output connector that complies with a second standard is connected, the method includes: connecting the video input connector to the video output port; generating a first signal that complies with a logical layer of the second standard; and generating a second signal by changing physical layer information of the first signal, the second signal being supplied to the video output port.

Information processing systems, information processing apparatus, and information processing methods according to embodiments of the present invention will be hereinafter described with reference to the accompanying drawings.

FIG. 1 shows a schematic appearance of an information processing system according to a first embodiment of the invention.

The information processing system 10 is equipped with an information processing apparatus 11 and a video terminal conversion adaptor (conversion adaptor) 12 which is connected to the information processing apparatus 11. The following description will be directed to a case that the information processing apparatus according to the invention is a notebook personal computer (hereinafter referred to as a personal computer) 11 having a video output port (DP socket) 13 which complies with the DisplayPort standard (DP standard) as a first standard and the conversion adaptor 12 has a video input terminal (DP plug) 14 which complies with the BP standard and a video output terminal (HDMI socket) 15 which complies with the HDMI standard as a second standard. The invention can be applied to, in addition to the DisplayPort-to-HDMI conversion adaptor 12 shown in FIG. 1, a DisplayPort-to-DVI conversion adaptor and the like.

As shown in FIG. 1, the personal computer 11 is electrically connected to the conversion adaptor 12 in such a manner that the video input terminal (DP plug) 14 of the conversion adaptor 12 is connected to the video output port (DP socket) 13. A terminal (HDMI plug) 17 that is provided at one end of an HDMI cable 16 is connected to the video output terminal (HDMI socket) 15 of the conversion adaptor 12. An external display device (monitor display) 20 which is a liquid crystal display, for example, and has a video input port (HDMI socket) 19 is electrically connected to the personal computer 11 via the HDMI cable 16 and the conversion adaptor 12 in such a manner that a terminal (HDMI plug) 18 that is provided at the other end of the HDMI cable 16 is connected to the video input port (HDMI socket) 19.

The personal computer 11 having the video output terminal 13 which complies with the DP standard can give a video signal to the external display device 20 having the video input port 19 which complies with the HDMI standard because the Former is connected to the latter via the conversion adaptor 12.

As shown in FIG. 1, the personal computer 11 is equipped with a computer main body 21 and a display unit 22.

The computer main body 21 has a thin, box-shaped body, and a central portion of the top surface of the body is provided with a keyboard as an input section 23. A user-side portion of the top surface of the body of the computer main body 21 is formed with a palm rest.

The display unit 22, which has a display module 24 which is an LCD (liquid crystal display) or the like, is connected to the computer main body 21 by link members (hinges) 25 which support the display unit 22 so that the display unit 22 can be opened and closed with respect to the computer main body 21.

Before description of the information processing system 10 according to this embodiment, a conventional information processing system 100 will be described briefly.

Each of the personal computer 11 according to the embodiment and a conventional personal computer 101 is configured so as to output a video signal that complies with the DP standard during ordinary use and to change the output video signal only when a conversion adaptor is connected to it so that the user can use a signal that complies with the HDMI standard.

Figure 2:
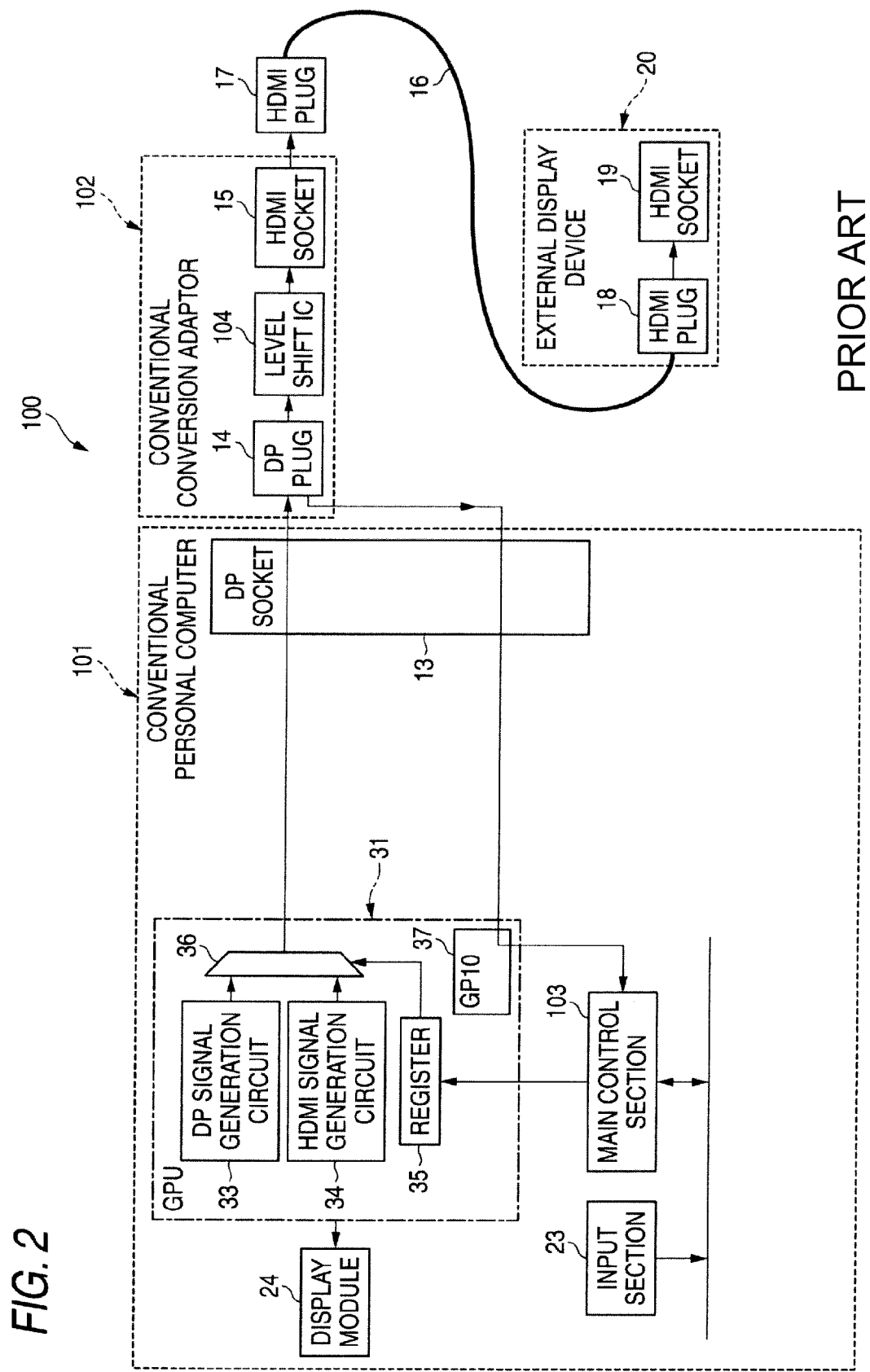
FIG. 2 is a block diagram schematically showing example internal configurations of a conventional information processing apparatus (personal computer) and a conventional conversion adaptor as a second conversion adaptor which constitute a conventional information processing system.

FIG. 2 is a block diagram schematically showing example internal configurations of the conventional information processing apparatus (personal computer) 101 and a conventional conversion adaptor 102 as a second conversion adaptor which constitute the conventional information processing system 100.

As shown in FIG. 2, the conventional personal computer 101 is equipped with an input section 23, a display module 24, a video output port (DP socket) 13, a GPU (graphics processing unit) 31 as an image processing module, and a conventional main control section 103.

The GPU 31 has a DP signal generation circuit 33, an HDMI signal generation circuit 34, a register 35, a multiplexer 36, and a GPTO (general-purpose input/output) 37.

The DP signal generation circuit 33 generates a video signal which complies with the physical layer and logical layer standards of the DP standard. The HDMI signal generation circuit 34 generates a video signal which complies with the logical layer standard of the HDMI standard (the DC level is not adjusted).

The main control section 103 writes information that is used for controlling the multiplexer 36 to the register 35, and the register 35 controls the multiplexer 36 on the basis of the information thus written. The multiplexer 26 outputs the video signal generated by the DP signal generation circuit 33 or the video signal generated by the HDMI signal generation circuit 34 on the basis of the information stored in the register 35.

The GPIO 37 of the GPU 31 receives a signal to the effect that the conversion adaptor 102 has been connected (hereinafter referred to as an adaptor recognition signal) from the conventional conversion adaptor 102 via the video output port (DP socket) 13 of the personal computer 101, and gives the adaptor recognition signal to the main control section 103.

The adaptor recognition signal may be a binary signal indicating whether the conversion adaptor 102 is connected. In this case, the adaptor recognition signal is set at "0" if the conversion adaptor 102 is connected and at "1" if the conversion adaptor 102 is not connected.

The main control section 103, which is composed of a CPU, a RAM, a storage medium as typified by a ROM, and other components, controls the whole processing including video signal processing of the personal computer 101 according to programs stored in these storage media.

For example, when receiving an adaptor recognition signal from the conventional conversion adaptor 102 via the GPIO 37 of the GPU 31 as a result of connection of the conventional conversion adaptor 102, the main control section 103 writes, to the register 35, information to the effect that an HDMI signal should be output. Based on the information written to the register 35, the multiplexer 36 outputs the video signal generated by the HDMI signal generation circuit 34.

The following description will be directed to a case that the DP signal generation circuit 33 generates a video signal that complies with the physical layer and logical layer standards of the DP standard and a DP bias module 38 is not necessary as shown in FIG. 2.

The conventional conversion adaptor 102 has a video input terminal (DP plug) 14, a video output terminal (HDMI socket) 15, and a level shift IC 104 as an integrated circuit.

When connected to the personal computer 101, the conventional conversion adaptor 102 receives a signal that complies with the logical layer standard of the HDMI standard via the video output port (DP socket) 13 of the personal computer 101 (the DC level is not adjusted).

The level shift IC 104 as an integrated circuit converts the signal received from the video input terminal (DP plug) 14 into a signal that complies with the physical layer standard of the HDMI standard by adjusting its bias voltage (physical layer information). As a result, a video signal that complies with the physical layer and logical layer standards of the HDMI standard is output from the level shift IC 104. The external display device 20 can receive this signal via the terminals 15, 17 and 18, input port 19 and the HDMI cable 16 and use it.

The conventional personal computer 101 outputs a signal that complies with the Logical layer standard of the HDMI standard (the DC level is not adjusted) when the conventional conversion adaptor 102 is connected to it. In the conventional conversion adaptor 102, the level shift IC 104 adjusts the bias voltage of the signal received from the personal computer 101. The conventional conversion adaptor 102 thus outputs a video signal that complies with the physical layer and logical layer standards of the HDMI standard.

The conventional information processing system 100 uses the level shift IC 104 to adjust the bias voltage. In general, ICs are less affected by variations in performance of components and are smaller in signal variation than circuits that are combinations of discrete components. Furthermore, even if the bias voltage of an input signal of the level shift IC 104 has a certain variation width, the level shift IC 104 can flexibly cope with it by IC control. Therefore, the level shift IC 104 can generate a proper output signal even if the bias voltage of an output signal of the personal computer 101 has a certain variation width due to, for example, differences in the specification of the GPU 31. Therefore, the conventional conversion adaptor 102 having the level shift IC 104 can be applied to different personal computers 101.

However, where video-signal-related information of the GPU 31 of a certain personal computer 101 is known, the use of the above type of IC only for the adjustment of the voltage of a video signal is too redundant. In this case, it suffices to construct a circuit for adjusting the bias voltage as a combination of discrete components. Undue signal variation can be prevented by providing, inside the personal computer 101, a circuit for adjusting the bias voltage and assuring the quality of the discrete components of this circuit in a manufacturing process of the personal computer 101.

In view of the above, the personal computer 11 according to the embodiment is equipped with a circuit for adjusting the bias voltage of an output signal of the HDMI signal generation circuit 34. And the output signal of the HDMI signal generation circuit 34 is converted into a video signal that complies with the physical layer and logical layer standards of the HDMI standard before the output of the video signal from the personal computer 11. Therefore, the conversion adaptor 12 according to the embodiment does not require the level shift IC 104. The personal computer 11 according to the embodiment is configured so as to accommodate a case that the conventional conversion adaptor 102 is connected to it.

Figure 3:
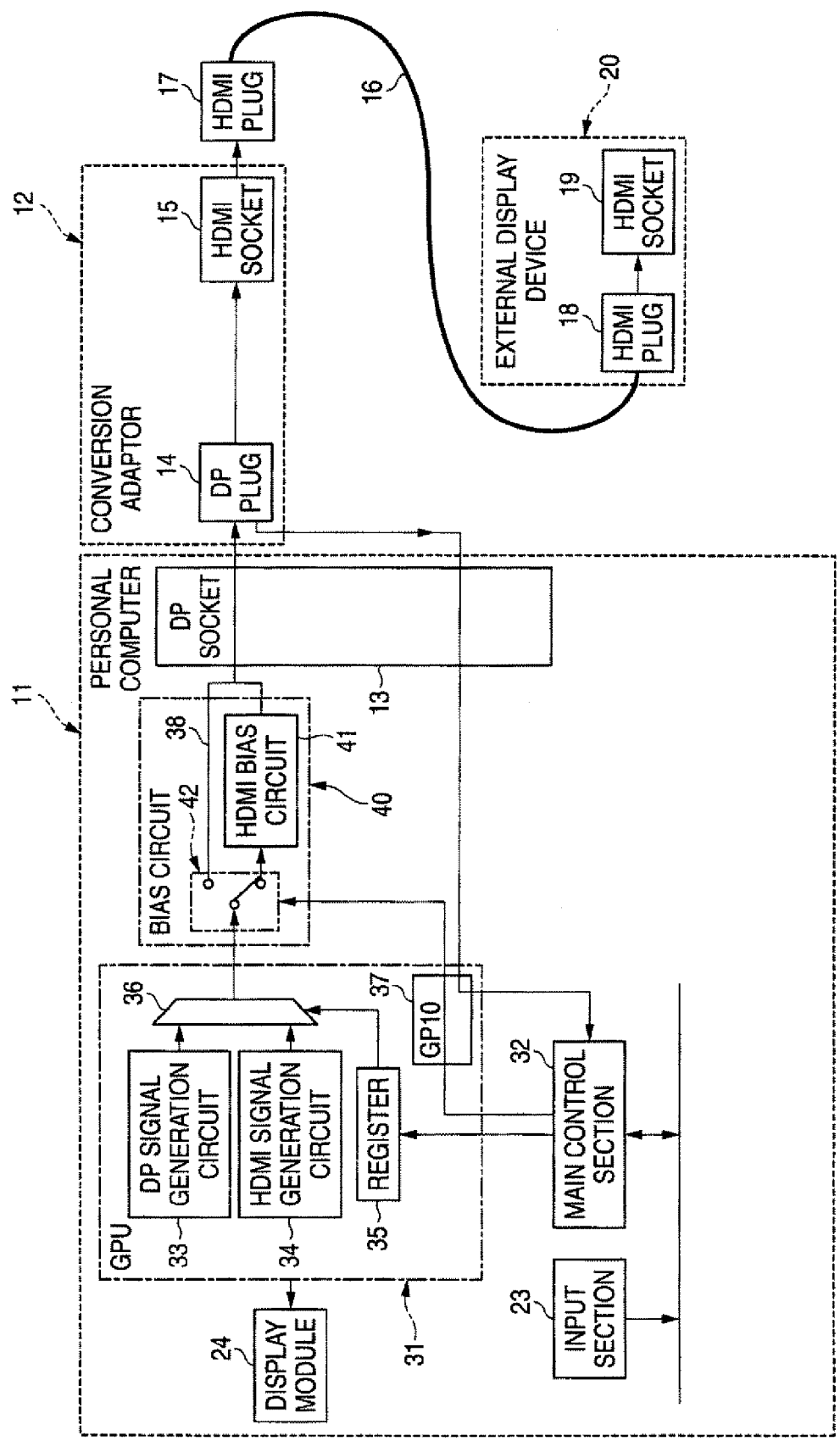
FIG. 3 is a block diagram schematically showing example internal configurations of a personal computer as an information processing apparatus according to the first embodiment and a conversion adaptor.
Figure 4:
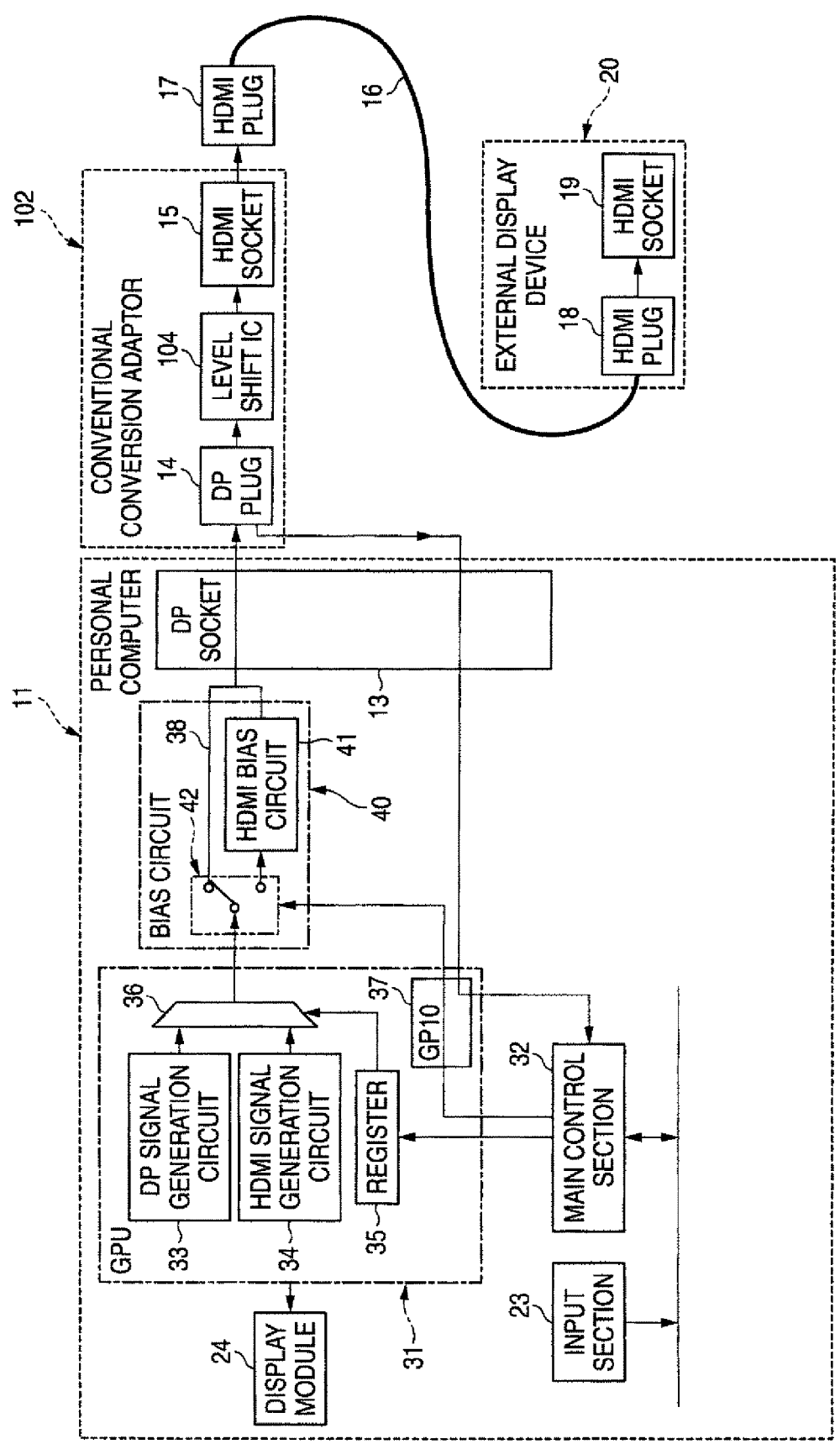
FIG. 4 is a block diagram schematically showing example internal configurations of the personal computer as the information processing apparatus according to the first embodiment and the conventional conversion adaptor.

FIG. 3 is a block diagram schematically showing example internal configurations of the personal computer 11 as the information processing apparatus according to the first embodiment and the conversion adaptor 12. FIG. 4 is a block diagram schematically showing example internal configurations of the personal computer 11 as the information processing apparatus according to the first embodiment and the conventional conversion adaptor 102.

As shown in FIGS. 3 and 4, the personal computer 11 according to the embodiment is equipped with an input section 23, a display module 24, a video output port (DP socket) 13 a GPU (graphics processing unit) 31, a main control section 32, and a bias module 40.

The GPU 31 has a DP signal generation circuit 33, an HDMI signal generation circuit 34, a register 35, a multiplexer 36, and a GPIO (general-purpose input/output) 37.

The DP signal generation circuit 33 generates a video signal which complies with the physical layer and logical layer standards of the DP standard. The HDMI signal generation circuit 34 generates a video signal which complies with the logical layer standard of the HDMI standard (the DC level is not adjusted).

The main control section 32 writes information that is used for controlling the multiplexer 36 to the register 35, and the register 35 controls the multiplexer 36 on the basis of the information thus written. The multiplexer 36 outputs the video signal generated by the DP signal generation circuit 33 or the video signal generated by the HDMI signal generation circuit 34 on the basis of the Information stored in the register 35.

The GPIO 37 of the GPU 31 receives a signal to the effect that the conversion adaptor 12 or the conventional conversion adaptor 102 has been connected (hereinafter referred to as an adaptor recognition signal) from the conversion adaptor 12 or the conventional conversion adaptor 102 via the video output port (DP socket) 13 of the personal computer 11, and gives the adaptor recognition signal to the main control section 32.

Furthermore, the GPIO 37 of the GPU 31 receives a control signal for the bias module 40 from the main control section 32 and gives it to the bias module 40.

The bias module 40 has a DP bias module 38, an HDMI bias module 41, and a switching section 42.

The DP bias module 38 is a circuit for supplying an output signal of the GPU 31 to the video output port (DP socket) 13 as it is a simple interconnection. In the embodiment, the DP bias module 38 can be a simple interconnection because the embodiment is directed to the case that the DP signal generation circuit 33 generates a video signal that complies with the physical layer and logical layer standards of the DP standard.

The HDMI bias module 41 is a combination of discrete components such as resistors and FETs (field-effect transistors). The HDMI bias module 41 converts an output signal of the GPU 31 into a signal that complies with the physical standard of the HDMI standard by adjusting the bias voltage (physical layer information) of the output signal of the GPU 31.

If the characteristics of the output signal of the HDMI signal generation circuit 34 are known, the circuit configuration of the HDMI bias module 41 can be determined easily. The personal computer 11 according to the embodiment is equipped with both of the GPU 31 and the HDMI bias module 41 and can acquire the characteristics of the output signal of the HDMI signal generation circuit 34 in advance. Therefore, the circuit configuration of the HDMI bias module 41 can be determined easily according to the output characteristics of the HDMI signal generation circuit 34.

As shown in FIGS. 3 and 4, one end of the switching section 42 is electrically connected to the multiplexer 36 and the other end is electrically connected to the DP bias module 38 or the HDMI bias module 41. The switching section 42 receives a control signal from the main control section 32 via the GPIO 37 of the GPU 31 and electrically connects the GPU 31 to the DP bias module 38 or the HDMI bias module 41. The following description will be directed to a case that in an ordinary use state the switching section 42 connects the GPU 31 to the DP bias module 38.

The main control section 32, which is composed of a CPU, a RAM, a storage medium as typified by a ROM, and other components, controls the whole processing including video signal processing of the personal computer 11 according to programs stored in these storage media. The CPU loads, into the RAM, a display driver program (hereinafter referred to as a display driver) and data used for execution of the display driver that are stored in the storage medium as typified by the ROM. When the conversion adaptor 12 has been connected to the personal computer 11, according to the display driver the CPU controls the GPU 31 and the bias module 40 and performs processing of outputting a signal that complies with the physical layer and logical layer standards of the HDMI standard from the personal computer 11.

For example, when receiving an adaptor recognition signal from the conversion adaptor 12 via the GPIO 37 of the GPU 31 as a result of connection of the conversion adaptor 12, the main control section 32 writes, to the register 35, information to the effect that an HDMI signal should be output. At the same time, the main control section 32 gives, to the bias module 40, via the GPIO 37 of the GPU 31, a control signal to the effect that the output signal of the GPU 31 should be supplied to the HDMI bias module 41. Based on the information written to the register 35, the multiplexer 36 outputs a video signal generated by the HDMI signal generation circuit 34. Based on the control signal, the switching section 42 of the bias module 40 electrically connects the GPU 31 to the HDMI bias module 41 and thereby supplies the output signal of the GPU 31 to the HDMI bias module 41. As a result, when the conversion adaptor 12 is connected, the bias module 40 outputs a signal that complies with the physical layer and logical layer standards of the HDMI standard and this signal is supplied to the video output port (DP socket) 13.

The RAM of the main control section 32 provides a work area where a program to be executed by the CPU and related data are stored temporarily.

The storage medium as typified by the ROM of the main control section 32 store a startup program of the personal computer 11, the display driver, and various data that are used for execution of these programs.

The storage medium as typified by the ROM includes a CPU-readable recording medium such as a magnetic recording medium, an optical recording medium, or a semiconductor memory. All or part of the programs and data to be stored in this storage medium may be downloaded over an electronic network.

The conversion adaptor 12 according to the embodiment has a video input terminal (DP plug) 14 and a video output terminal (HDMI socket) 15.

The personal computer 11 according to the embodiment outputs a signal that complies with the physical layer and logical layer standards of the HDMI standard when the conversion adaptor 12 is connected to it. Therefore, unlike the conventional conversion adaptor 102, the conversion adaptor 12 does not require the level shift IC 104.

Figure 5:
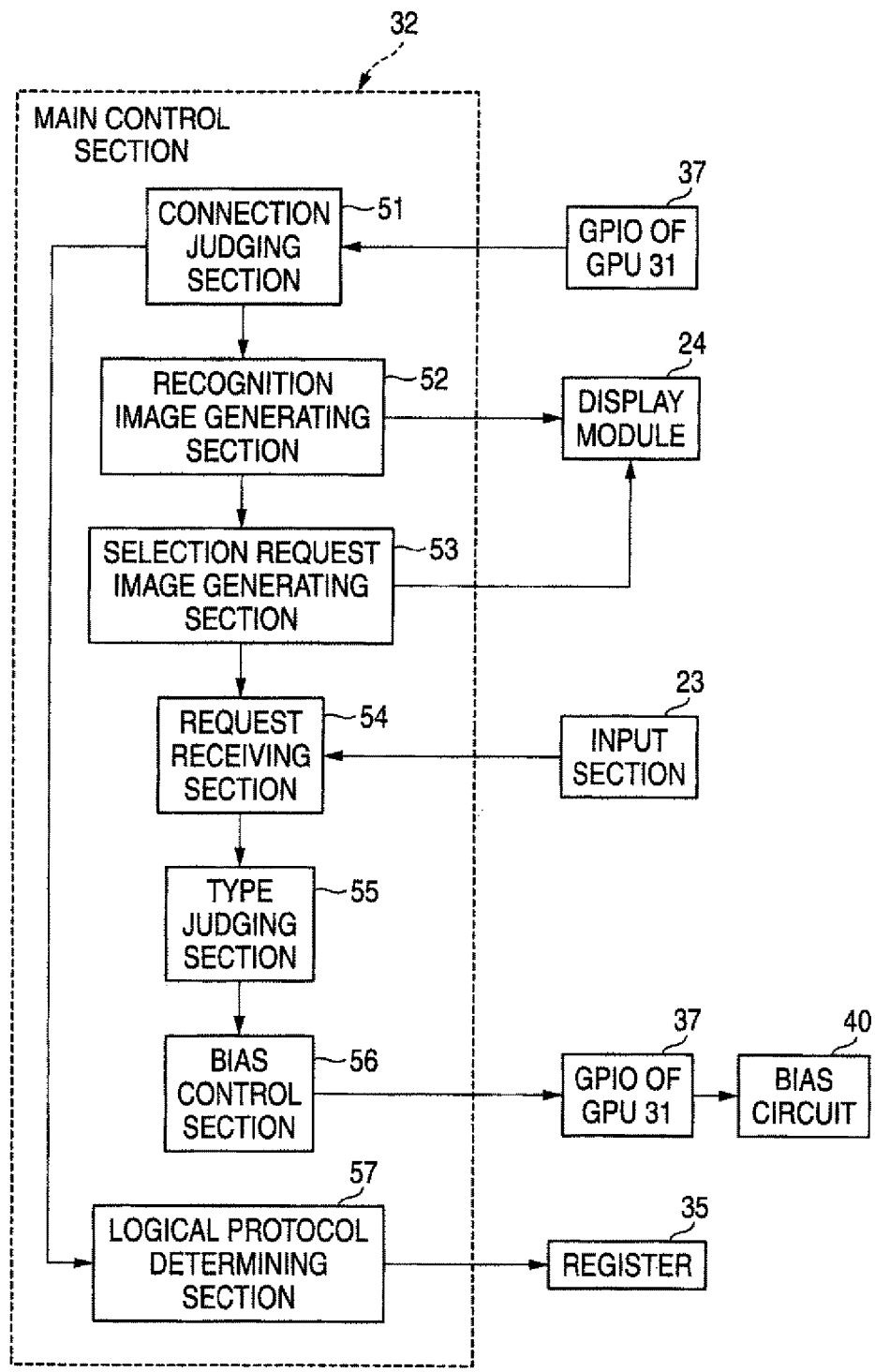
FIG. 5 is a block diagram schematically showing example function implementing sections of a CPU of a main control section according to the first embodiment.

FIG. 5 is a block diagram schematically showing example function implementing sections of the CPU of the main control section 32 according to the first embodiment. Alternatively, the function implementing sections may be formed by a hardware logic such as a circuit without using the CPU.

The CPU of the main control section 32 at least functions as a connection judging section 51, a recognition image generating section 52, a selection request image generating section 53, a selection receiving section 54, a type judging section 55, a logical protocol determination section 57, and a bias control section 56 according to the display driver. Each of the sections 51-57 uses a prescribed work area of the RAM of the main control section 32 as a temporary data storage area.

The connection judging section 51 receives an adaptor recognition signal from the conversion adaptor 12 or the conventional conversion adaptor 102 via the GPIO 37 of the GPU 31, and judges, on the basis of the adaptor recognition signal, whether the conversion adaptor 12 or the conventional conversion adaptor 102 is connected to the personal computer 11.

If the conversion adaptor 12 or the conventional conversion adaptor 102 is connected to the personal computer 11, the recognition image generating section 52 generates an image for presenting information to that effect to the user and causes the display module 24 to display the generated image.

The selection request image generating section 53 generates an image for prompting the user to make a setting indicating the connected adaptor (conversion adaptor 12 or conventional conversion adaptor 102) and causes the display module 24 to display the generated image.

The images generated by the recognition image generating section 52 and the selection request image generating section 53 may be character strings in the case where, for example, the display module 24 has so low a capability as to be able to display only text information.

The selection receiving section 54 acquires adaptor type information indicating which of the conversion adaptor 12 and the conventional conversion adaptor 102 is connected (i.e., selected by the user through the input section 23).

Based on the adaptor type information acquired by the selection receiving section 54, the type judging section 55 judges which of the conversion adaptor 12 and the conventional conversion adaptor 102 is connected.

If the connection judging section 51 judges that the conversion adaptor 12 or the conventional conversion adaptor 102 is connected, the logical protocol determination section 57 writes, to the register 35, information to the effect that an output signal of the HDMI signal generation circuit 34 should be made valid. Based on this information, the register 35 controls the multiplexer 36 so that it outputs the video signal generated by the HDMI signal generation circuit 34.

If the type judging section 55 judges that the conversion adaptor 12 is connected, the bias control section 56 gives, to the switching section 42 of the bias module 40, via the GPIO 37 of the GPU 31, a control signal to the effect that an output signal of the GPU 31 should be supplied to the HDMI bias module 41. If the type judging section 55 judges that the conventional conversion adaptor 102 is connected, the bias control section 56 gives, to the switching section 42 of the bias module 40, via the GPIO 37 of the GPU 31, a control signal to the effect that an output signal of the GPU 31 should be supplied to the DP bias module 38.

Next, an example operation of the information processing system 10 according to the embodiment will be described.

Figure 6:
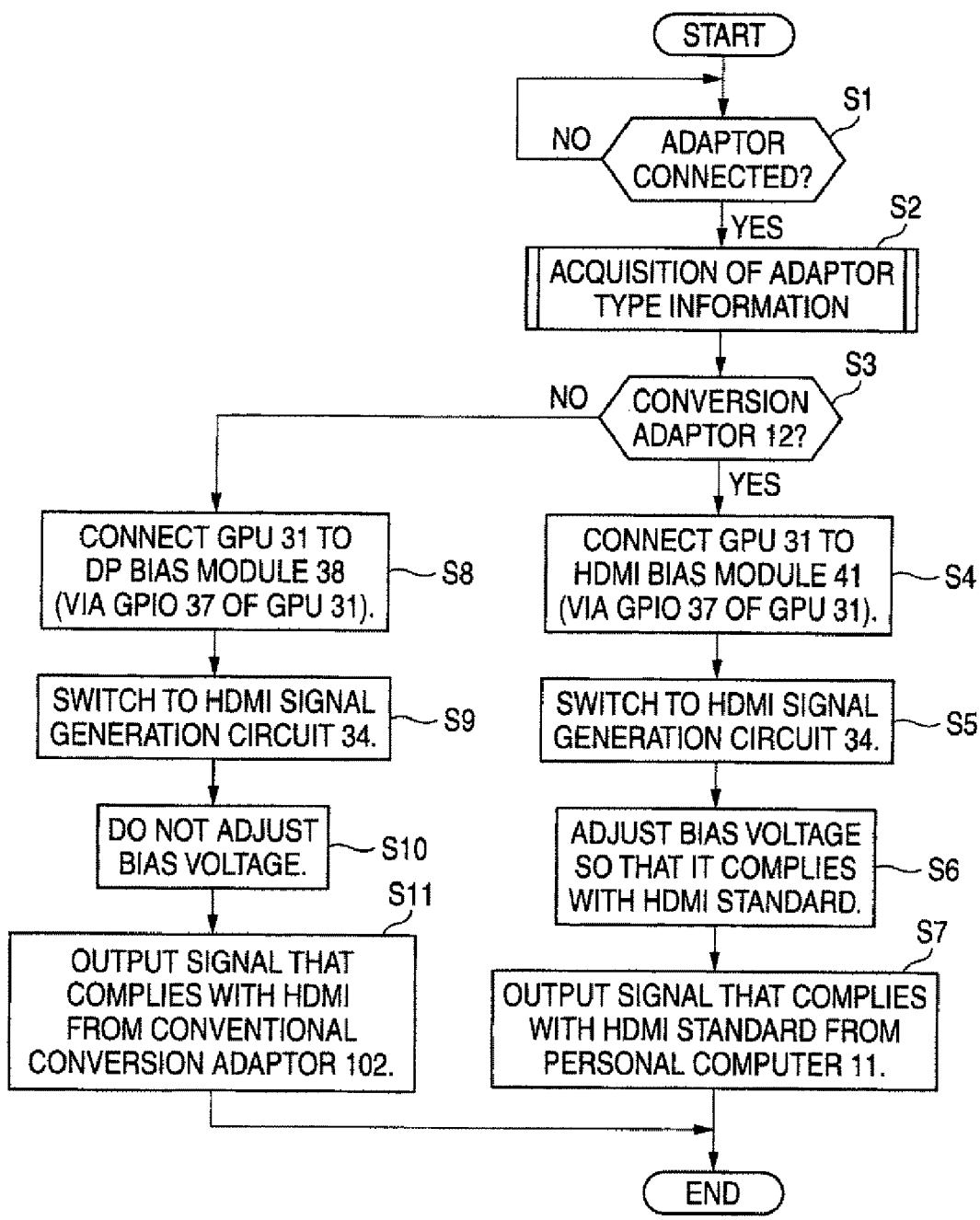
FIG. 6 is a flowchart of a procedure that upon connection of the conversion adaptor to the personal computer the CPU of the main control section according to the first embodiment controls a GPU and a bias module so that the personal computer outputs a signal that complies with the physical layer and logical layer standards of the HDMI standard.

FIG. 6 is a flowchart of a procedure that upon connection of the conversion adaptor 12 to the personal computer 11 the CPU of the main control section 32 according to the first embodiment controls the GPU 31 and the bias module 40 so that the personal computer 11 outputs a signal that complies with the physical layer and logical layer standards of the HDMI standard. In FIG. 6, symbols each being a combination of "S" and a number denote steps of the flowchart.

This procedure is started in a state that nothing is connected to the video output port (DP socket) 13 of the personal computer 11 and the switching section 42 connects the GPU 31 to the DP bias module 38. The following description will be directed to the case that the DP bias module 38 is a circuit for supplying an output signal of the GPU 31 to the video output port (DP socket) 13 as it is and is a simple interconnection.

First, at step S1, the connection judging section 51 receives an adaptor recognition signal from the conversion adaptor 12 or the conventional conversion adaptor 102 via the GPIO 37 of the GPU 31, and judges, on the basis of the adaptor recognition signal, whether the conversion adaptor 12 or the conventional conversion adaptor 102 is connected to the personal computer 11. If the conversion adaptor 12 or the conventional conversion adaptor 102 is connected, the process moves to step S2. On the other hand, if neither the conversion adaptor 12 nor the conventional conversion adaptor 102 is connected, the monitoring as to whether the conversion adaptor 12 or the conventional conversion adaptor 102 is connected to the personal computer 11 is continued.

At step S2, the main control section 32 acquires adaptor type information indicating which of the conversion adaptor 12 and the conventional conversion adaptor 102 is connected.

At step S3, the type judging section 55 judges, on the basis of the adaptor type information, which of the conversion adaptor 12 and the conventional conversion adaptor 102 is connected. If the conversion adaptor 12 is connected, the process moves to step S4. On the other hand, if the conventional conversion adaptor 102 is connected, the process moves to step S8.

At step S4, the bias control section 56 gives, to the switching section 42 of the bias module 40, via the GPIO 37 of the GPU 31, a control signal to the effect that an output signal of the GPU 31 should be supplied to the HDMI bias module 41.

As a result, based on the control signal, the switching section 42 connects the GPU 31 to the HDMI bias module 41 (refer to the switching section 42 shown in FIG. 3).

At step S5, the logical protocol determination section 57 receives, from the connection judging section 51, information to the effect that the conversion adaptor 12 or the conventional conversion adaptor 102 is connected to the personal computer 11, and writes, to the register 35 of the GPU 31, information to the effect that an output signal of the HDMI signal generation circuit 34 should be made valid. As a result, based on the information stored in the register 35, the multiplexer 36 outputs the video signal generated by the HDMI signal generation circuit 34.

At step S6, the bias module 40 receives, from the multiplexer 36 of the GPU 31, the video signal that is generated by the HDMI signal generation circuit 34 and complies with the logical layer standard of the HDMI standard (the DC level is not adjusted). The bias module 40 converts the received signal into a signal that complies with the physical layer and logical layer standards of the HDMI standard by adjusting the bias voltage (physical layer information) of the received signal with the HDMI bias module 41.

At step S7, the signal that is output from the bias module 40 and complies with the physical layer and logical layer standards of the HDMI standard is supplied to the conversion adaptor 12 from the video output port (DP socket) 13 of the personal computer 11 and then to the external display device 20 via the HDMI cable 16.

According to the above-described steps S1-S7, when the conversion adaptor 12 is connected to the personal computer 11, the personal computer 11 outputs a signal that complies with the physical layer and logical layer standards of the HDMI standard. The personal computer 11 can thus supplies a signal that complies with the physical layer and logical layer standards of the HDMI standard to the external display device 20 via the conversion adaptor 12.

On the other hand, if the type judging section 55 judges at step S3 that the conventional conversion adaptor 102 is connected, at step S8 the bias control section 56 gives, to the switching section 42 of the bias module 40, via the GPIO 37 of the GPU 31, a control signal to the effect that an output signal of the GPU 31 should be supplied to the DP bias module 38. As a result, the switching section 42 maintains the state that the GPU 31 is connected to the DP bias module 38 (refer to the switching section 42 shown in FIG. 4).

At step S9, as in step S5, the logical protocol determination section 57 receives, from the connection judging section 51, information to the effect that the conversion adaptor 12 or the conventional conversion adaptor 102 is connected to the personal computer 11, and writes, to the register 35 of the GPU 31, information to the effect that an output signal of the HDMI signal generation circuit 34 should be made valid. As a result, based on the information stored in the register 35, the multiplexer 36 outputs the video signal generated by the HDMI signal generation circuit 34.

At step S10, the bias module 40 receives, from the multiplexer 36 of the GPU 31, the video signal that is generated by the HDMI signal generation circuit 34 and complies with the logical layer standard of the HDMI standard. The bias module 40 outputs the received signal as it is through the DP bias module 38.

At step S11, the conventional conversion adaptor 102 receives the video signal that is output from the bias module 40 and complies with the logical layer standard of the HDMI standard. of The conventional conversion adaptor 102 outputs a DC-level-adjusted signal by adjusting the bias voltage (physical layer information) of the received signal with the level shift IC 104.

According to the above-described steps S1-S3 and S8-S11, when the conventional conversion adaptor 102 is connected to the personal computer 11, the personal computer 11 outputs a video signal that complies with the logical layer standard of the HDMI standard (the DC level is not adjusted). The personal computer 11 allows a signal that complies with the physical layer and logical layer standards of the HDMI standard to be supplied to the external display device 20 via the conventional conversion adaptor 102.

Next, a description will be made of a procedure for acquiring adaptor type information indicating which of the conversion adaptor 12 or the conventional conversion adaptor 102 is connected.

Figure 7:
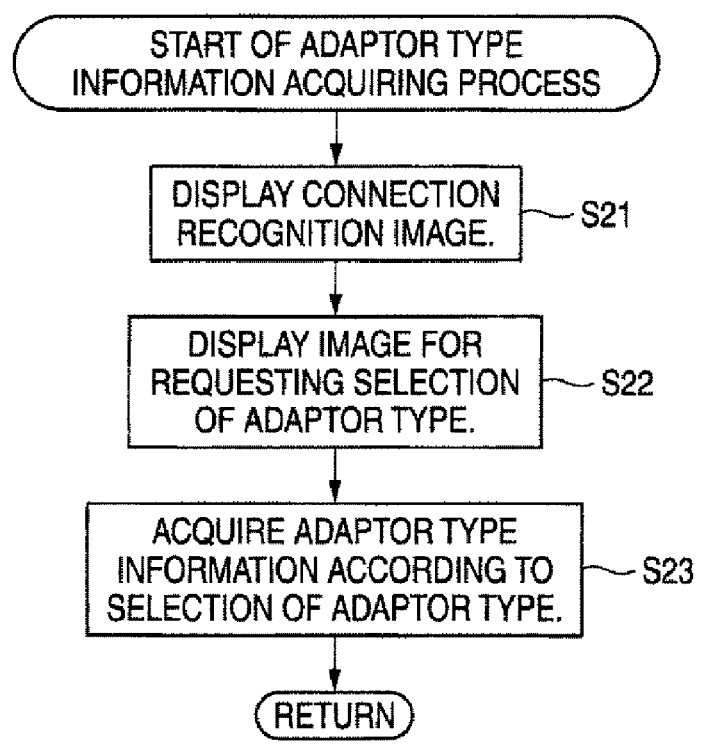
FIG. 7 is a subroutine flowchart of an adaptor type information acquiring procedure which is executed by the main control section at step S2 in FIG. 6.

FIG. 7 is a subroutine flowchart of an adaptor type information acquiring procedure which is executed by the main control section 32 at step S2 in FIG. 6. In FIG. 7, symbols each being a combination of "S" and a number denote steps of the flowchart.

At step S21, when the conversion adaptor 12 or the conventional conversion adaptor 102 is connected to the personal computer 11, the recognition image generating section 52 generates an image for presenting information to that effect to the user and causes the display module 24 to display the generated image.

At step S22, the selection request image generating section 53 generates an image for prompting the user to make a setting indicating the connected adaptor (conversion adaptor 12 or conventional conversion adaptor 102) and causes the display module 24 to display the generated image.

At step S23, the selection receiving section 54 acquires adaptor type information indicating which of the conversion adaptor 12 and the conventional conversion adaptor 102 is connected (i.e., selected by the user through the input section 23) and gives the adaptor type information to the type judging section 55. Then, the process moves to step S3 in FIG. 6.

According to the above procedure, the main control section 32 can acquire adaptor type information indicating which of the conversion adaptor 12 and the conventional conversion adaptor 102 is connected.

The personal computer 11 according to the embodiment is equipped with the HDMI bias module 41. The HDMI bias module 41 is configured so as to be suitable for the characteristics of the HDMI signal generation circuit 34 of the GPU 31 of the personal computer 11. Therefore, the personal computer 11 can output a signal that complies with the physical layer and logical layer standards of the HDMI standard. Therefore, the conversion adaptor 12 does not require the level shift IC 104 for adjusting the bias voltage of an output signal of the personal computer 11 and hence can be very simple in configuration.

The HDMI bias module 41 is formed by inexpensive discrete components according to the characteristics of the HDMI signal generation circuit 34. Therefore, the information processing system 10 according to the embodiment can be constructed at a lower cost than the conventional information processing system 100 which uses the conventional conversion adaptor 102 which requires the level shift IC 104.

Although the embodiment is directed to the case that the conversion adaptor 12 is a DisplayPort-to-HDMI conversion adaptor, a DisplayPort-to-DVI conversion adaptor can be used as the conversion adaptor 12. This is because the HDMI standard and the DVI standard are approximately the same in the physical layer and logical layer standards.

The information processing system 10 according to the invention can also be applied to a case that the video output terminal of a conversion adaptor complies with a standard other than the HDMI standard and the DVI standard. In this case, the GPU 31 should have a signal generation circuit that complies with the other standard and the bias module 40 should be one suitable for the other standard.

Figure 8:
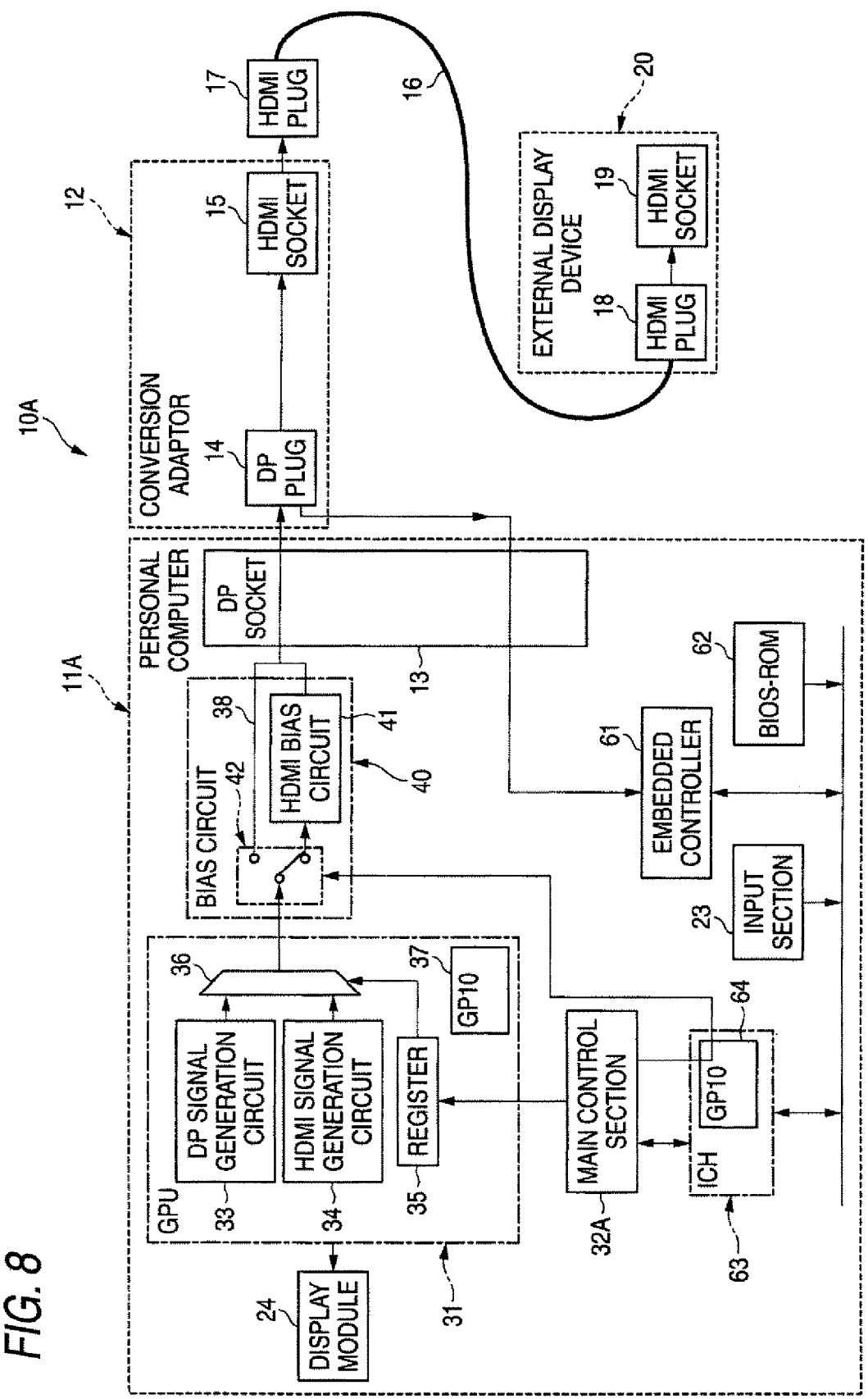
FIG. 8 is a block diagram schematically showing example internal configurations of a personal computer as an information processing apparatus according to a second embodiment and the conversion adaptor.
Figure 9:
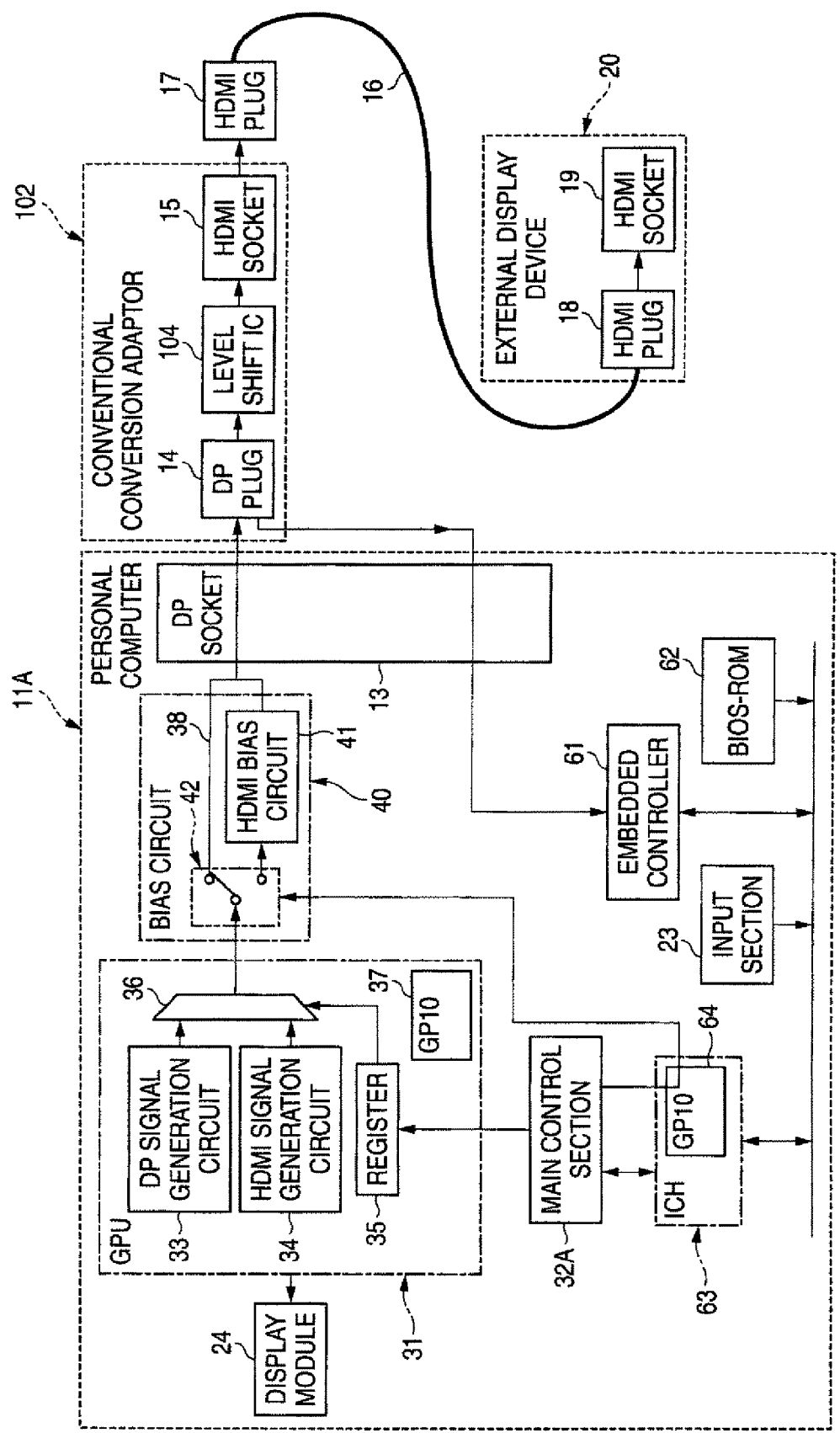
FIG. 9 is a block diagram schematically showing example internal configurations of the personal computer as the information processing apparatus according to the second embodiment and the conventional conversion adaptor.

FIG. 8 is a block diagram schematically showing example internal configurations of a personal computer 11A as an information processing apparatus according to a second embodiment and the conversion adaptor 12. FIG. 9 is a block diagram schematically showing example internal configurations of the personal computer 11A as the information processing apparatus according to the second embodiment and the conventional conversion adaptor 102.

An information processing system 10A according to the second embodiment is different from the information processing system 10 according to the first embodiment in that a main control section 32A of the personal computer 11A performs processing using a BIOS (basic input/output system) in addition to the display driver and does not use the GPIO 37 of the GPU 31. The other part of the configuration and the other part of the workings of the information processing system 10A according to the second embodiment are substantially the same as those of information processing system 10 according to the first embodiment, and hence components having the same components in the first embodiment will be given the same reference symbols as the latter and will not be described in detail.

As shown in FIGS. 8 and 9, the personal computer 11A according to this embodiment is equipped with an input section 23, a display module 24, a video output terminal (DP socket) 13, a GPU (graphics processing unit) 31, the main control section 32A, an embedded controller 61, a BIOS-ROM 62, and an ICH (input/output controller hub) 63.

The embedded controller 61 not only controls the input section 23 and various switches such as a power button knot shown) but also receives an adaptor recognition signal directly from the video output terminal (DP socket) 13 and supplies the received adaptor recognition signal to the main control section 32A. The embedded controller 61 is a one-chip microcomputer which monitors and controls various devices (peripheral devices, sensors, power circuits, etc.) irrespective of the system state of the personal computer 11A.

The embedded controller 61 at least functions as a connection judging section (EC) 71 whose function is equivalent to the function of the connection judging section 51 of the main control section 32 according to the first embodiment and a connection notifying section (EC) 72 which gives, to the main control section 32A, on the basis of an adaptor recognition signal, information to the effect that the conversion adaptor 12 or the conventional conversion adaptor 102 is connected to the personal computer 11A. Symbol (EC) means that the section is a function implementing section of the embedded controller 61.

The BIOS-ROM 62, which is a storage medium capable of retaining storage contents even during a system shutdown, stores a BIOS (basic input/output system). The BIOS-ROM 62 may be either a nonvolatile storage medium such as an EEPROM or a CMOS (complementary metal-oxide-semiconductor) memory that is always supplied with power from an auxiliary power source. The BIOS includes a program that is used for video signal processing according to the embodiment.

The ICH 63, which at least has a GPIO 64, is what is called a south bridge in which I/O controller functions of various devices are integrated together.

The GPIO 64 of the ICH 63 receives a control signal for the bias module 40 from the main control section 32A and supplies it to the bias module 40.

Figure 10:
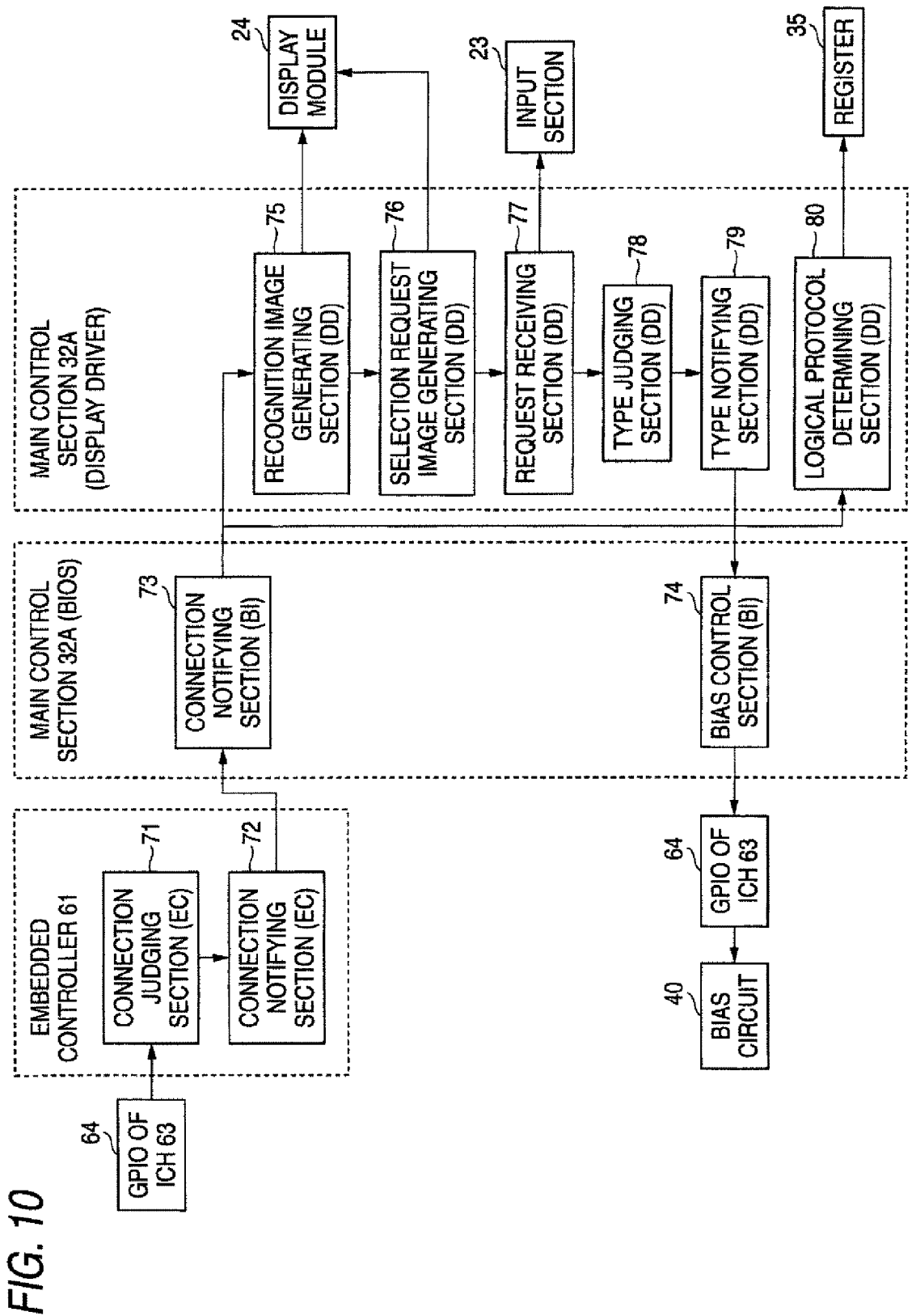
FIG. 10 is a block diagram schematically showing example function implementing sections of a CPU of a main control section and an embedded controller according to the second embodiment.

FIG. 10 is a block diagram schematically showing example function implementing sections of the CPU of the main control section 32A and the embedded controller 61 according to the second embodiment. Alternatively, the function implementing sections may be formed by a hardware logic such as a circuit using neither the CPU nor the embedded controller 61.

The CPU of the main control section 32A at least functions as a connection notifying section (BI) 73 and a bias control section (BI) 74 according to the BIOS. Symbol (BI) means that the section is a function implementing section of the main control section 32A that operates according to the BIOS.

The CPU of the main control section 32A at least functions as a recognition image generating section (DD) 75, a selection request image generating section (DD) 76, a selection receiving section (DD) 77, a type judging section (DD) 78, a type notifying section (DD) 79, and a logical protocol determination section (DD) 80. Symbol (DD) means that the section is a function implementing section of the main control section 32A that operates according to the display driver. Each of the sections 73-80 uses a prescribed work area of the RAM of the main control section 32A as a temporary data storage area.

The connection notifying section (BI) 73 receives, from the connection notifying section (EC) 72, information to the effect that the conversion adaptor 12 or the conventional conversion adaptor 102 is connected to the personal computer 11A, and gives this information to the recognition image generating section (DD) 75 and the logical protocol determination section (DD) 80.

The bias control section (BI) 74 receives, from the type notifying section (DD) 79, adaptor type information indicating which of the conversion adaptor 12 and the conventional conversion adaptor 102 is connected. If the conversion adaptor 12 is connected, the bias control section (BI) 74 supplies, to the switching section 42 of the bias module 40, via the GPIO 64 of the ICH 63, a control signal to the effect that an output signal of the GPU 31 should be supplied to the HDMI bias module 41. If the conventional conversion adaptor 102 is connected, the bias control section (BI) 74 supplies, to the switching section 42 of the bias module 40, via the GPIO 64 of the ICH 63, a control signal to the effect that an output signal of the GPU 31 should be supplied to the DP bias module 38.

The recognition image generating section (DD) 75 receives, from connection notifying section (BI) 73, the information to the effect that the conversion adaptor 12 or the conventional conversion adaptor 102 is connected to the personal computer 11A, generates an image for presenting this information to the user, and causes the display module 24 to display the generated image.

The selection request image generating section (DD) 76, the selection receiving section (DD) 77, the type judging section (DD) 78 are the same in configuration and workings as the selection request image generating section 53, the selection receiving section 54, and the type judging section 55, respectively, that were described in the first embodiment and hence will not be described in detail.

The type notifying section (DD) 79 gives adaptor type information to the bias control section (BI) 74.

The logical protocol determination section (DD) 80 receives, from the connection notifying section (BI) 73, the information to the effect that the conversion adaptor 12 or the conventional conversion adaptor 102 is connected to the personal computer 11A, and writes, to the register 35, information to the effect that an output signal of the HDMI signal generation circuit 34 should be made valid. Based on this information, the register 35 controls multiplexer 36 so that it outputs the video signal generated by the HDMI signal generation circuit 34.

Next, an example operation of the information processing system 10A according to the second embodiment will be described.

Figure 11:
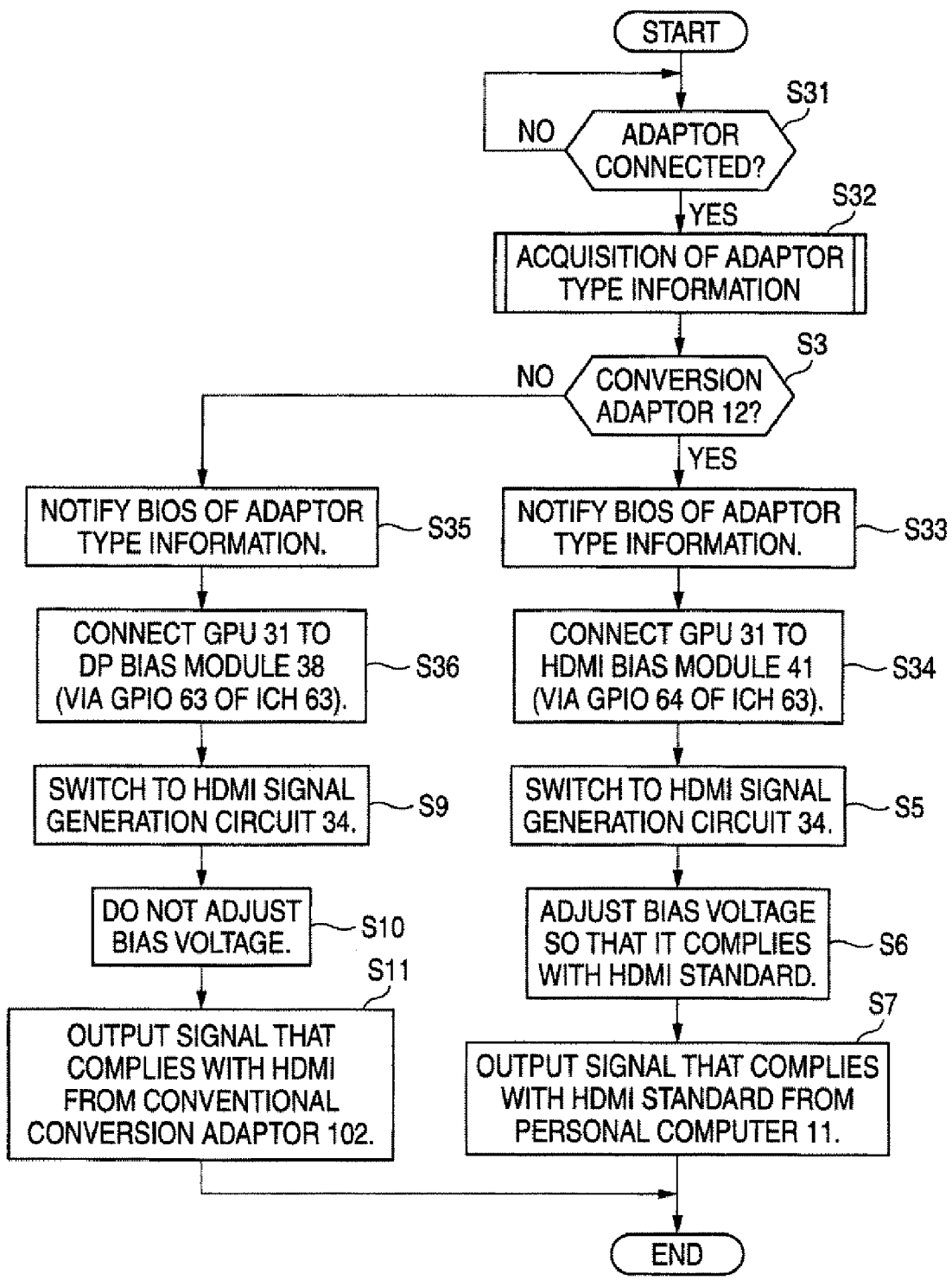
FIG. 11 is a flowchart of a procedure that upon connection of the conversion adaptor to the personal computer a CPU of the main control section according to the second embodiment controls a GPU and a bias module so that the personal computer outputs a signal that complies with the physical layer and logical layer standards of the HDMI standard.

FIG. 11 is a flowchart of a procedure that upon connection of the conversion adaptor 12 to the personal computer 11A the CPU of the main control section 32A according to the second embodiment controls the GPU 31 and the bias module 40 so that the personal computer 11A outputs a signal that complies with the physical layer and logical layer standards of the HDMI standard. In FIG. 11, symbols each being a combination of "S" and a number denote steps of the flowchart. Steps having the same steps in FIG. 6 are given the same symbols as the latter and redundant descriptions will be avoided.

This procedure is started in a state that nothing is connected to the video output port (DP socket) 13 of the personal computer 11A and the switching section 42 connects the GPU 31 to the DP bias module 38. The following description will be directed to the case that the DP bias module 38 is a circuit for supplying an output signal of the GPU 31 to the video output port (DP socket) 13 as it is and is a simple interconnection.

At step S31, the connection judging section (EC) 71 receives adaptor recognition signal from the conversion adaptor 12 or the conventional conversion adaptor 102 without passage through the GPIO 37 of the GPU 31, and judges, on the basis of the adaptor recognition signal, whether the conversion adaptor 12 or the conventional conversion adaptor 102 is connected to the personal computer 11A. If the conversion adaptor 12 or the conventional conversion adaptor 102 is connected, the process moves to step S32. On the other hand, if neither the conversion adaptor 12 nor the conventional conversion adaptor 102 is connected, the monitoring as to whether the conversion adaptor 12 or the conventional conversion adaptor 102 is connected to the personal computer 11A is continued.

At step S32, the main control section 32A acquires adaptor type information indicating which of the conversion adaptor 12 and the conventional conversion adaptor 102 is connected.

At step S33, the type notifying section (DD) 79 gives the bias control section (BI) 74 adaptor type information to the effect that the conversion adaptor 12 is connected.

At step S34, the bias control section (BI) 74 supplies, to the switching section 42 of the bias module 40, via the GPIO 64 of the ICH 63, a control signal to the effect that an output signal of the GPU 31 should be supplied to the HDMI bias module 41. As a result, based on this control signal, the switching section 42 connects the GPU 31 to the HDMI bias module 41 (refer to the switching section 42 shown in FIG. 8).

At step S35, the type notifying section (DD) 79 gives the bias control section (BI) 74 adaptor type information to the effect that the conventional conversion adaptor 102 is connected.

At step S36, the bias control section (BI) 74 supplies, to the switching section 42 of the bias module 40, via the GPIO 64 of the ICH 63, a control signal to the effect that an output signal of the GPU 31 should be supplied to the HDMI bias module 41. As a result, based on this control signal, the switching section 42 connects the GPU 31 to the DP bias module 38 (refer to the switching section 42 shown in FIG. 9).

According to the procedure of FIG. 11, when the conversion adaptor 12 is connected to the personal computer 11A, the personal computer 11A outputs a signal that complies with the physical layer and logical layer standards of the HDMI standard without passage through the GPIO 37 of the GPU 31. The personal computer 11A can thus supplies a signal that complies with the physical layer and logical layer standards of the HDMI standard to the external display device 20 via the conversion adaptor 12. When the conventional conversion adaptor 102 is connected to the personal computer 11A, the personal computer 11A outputs a signal that complies with the logical layer standard of the HDMI standard without passage through the GPIO 37 of the GPU 31. The personal computer 11A thus allows a signal that complies with the physical layer and logical layer standards of the HDMI standard to be supplied to the external display device 20 via the conventional conversion adaptor 102.

Figure 12:
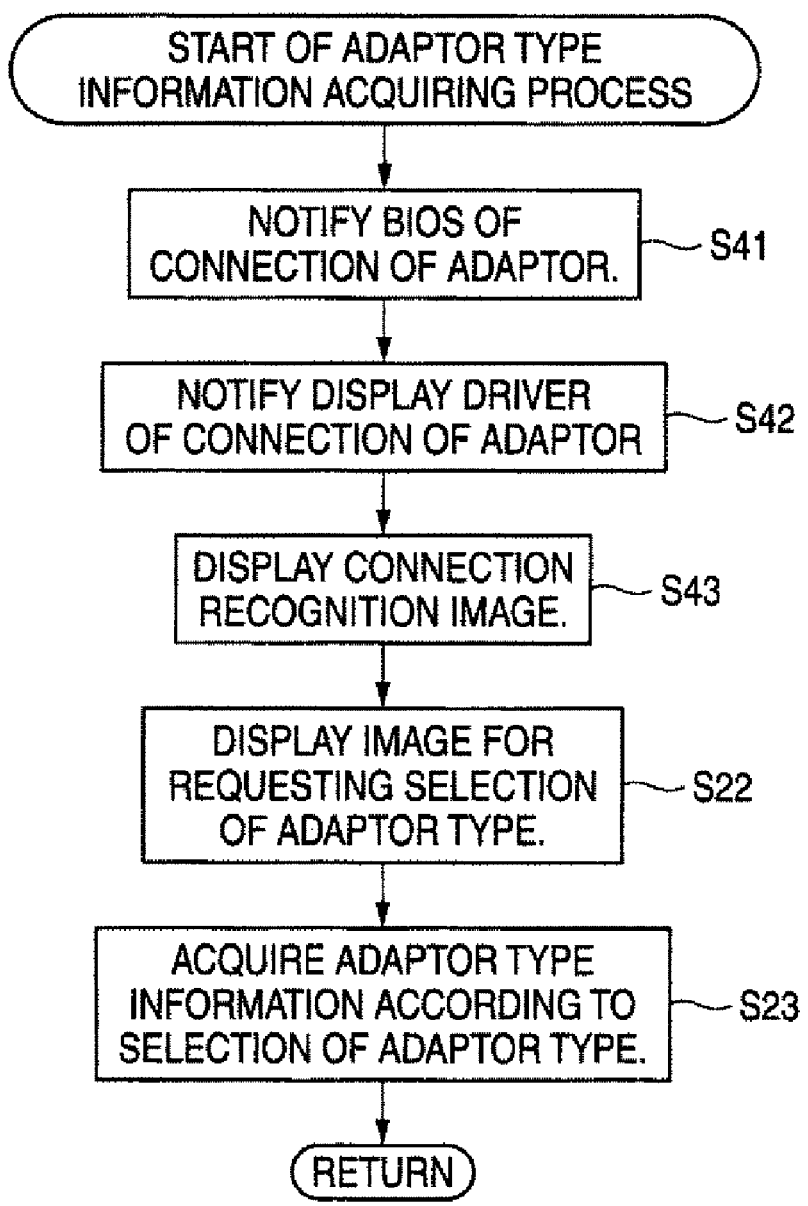
FIG. 12 is a subroutine flowchart of an adaptor type information acquiring procedure which is executed by the main control section at step S32 in FIG. 11.

FIG. 12 is a subroutine flowchart of an adaptor type information acquiring procedure which is executed by the main control section 32A at step S32 in FIG. 11. In FIG. 12, symbols each being a combination of "S" and a number denote steps of the flowchart. Steps having the same steps in FIG. 7 are given the same symbols as the latter and redundant descriptions will be avoided.

At step S41, the connection notifying section (EC) 72 receives, from the connection judging section (EC) 71 information to the effect that the conversion adaptor 12 or the conventional conversion adaptor 102 is connected, and gives this information to the connection notifying section (BI) 73 of the main control section 32A.

At step S42, receiving, from the connection notifying section (EC) 72, the information to the effect that the conversion adaptor 12 or the conventional conversion adaptor 102 is connected, the connection notifying section (BI) 73 gives this information to the recognition image generating section (DD) 75.

At step S43, receiving, from the connection notifying section (BI) 73, the information to the effect that the conversion adaptor 12 or the conventional conversion adaptor 102 is connected to the personal computer 11A, the recognition image generating section (DD) 75 generates an image for presenting this information to the user and causes the display module 24 to display the generated image.

According to the above procedure, as in the case of the procedure of FIG. 7, the main control section 32A can acquire adaptor type information indicating which of the conversion adaptor 12 and the conventional conversion adaptor 102 is connected.

The information processing system 10A according to this embodiment does not use the GPIO 37 of the GPU 31. Therefore, the information processing system 10A according to this embodiment provides the same advantages as the information processing system 10 according to the first embodiment does without the need for altering the specification of the conventionally used GPIO 37 of the GPU 31.

The invention is not limited to the above embodiments themselves and, in the practice stage, may be embodied in such a manner that constituent elements are modified without departing from the spirit and scope of the invention. And various inventions can be conceived by properly combining plural constituent elements disclosed in each embodiment. For example, several ones of the constituent elements of each embodiment may be omitted. Furthermore, constituent elements of the different embodiments may be combined as appropriate. Furthermore, constituent elements of plural embodiments may be combined as appropriate.

In the embodiments of the invention, the steps of each process described in the form of a flowchart are executed in the time-series order as written in the flowchart. However, the invention encompasses a case that steps are executed parallel or individually rather than in time-series order.

As described with reference to the above embodiment, there is provided an information processing apparatus which has a circuit that is composed of discrete components and performs voltage adjustment on an output video signal and which can simplify the configuration of a conversion adaptor, as well as an information processing system provided with the information processing apparatus and an information processing method of the information processing apparatus.

The information processing system, the information processing apparatus, and the information processing method according to the embodiment perform voltage adjustment on an output video signal by means of a circuit composed of discrete components and simplify the configuration of a conversion adaptor.

What is claimed is:

1. An information processing apparatus capable of connecting with a video terminal conversion adaptor for connecting a video output port of the information processing apparatus complying with a first standard and a video input port of an external device complying with a second standard and capable of receiving an adaptor recognition signal output from the video terminal conversion adaptor, the video terminal conversion adaptor having a video input terminal complying with the first standard and a video output terminal complying with the second standard, the video terminal conversion adaptor outputting the adaptor recognition signal through the video input terminal complying with the first standard, the information processing apparatus comprising:

the video output port complying with the first standard to be connected with the video input terminal complying with the first standard of the video terminal conversion adaptor;

a connection determination module configured to determine that the video terminal conversion adaptor is connected when receiving the adaptor recognition signal from the video terminal conversion adaptor through the video output port complying with the first standard;

an image processing module configured to output a first signal to a bias module complying with a logical layer standard of the second standard when the connection determination module determines that the video terminal conversion adaptor is connected, and configured to output the first signal to the bias module complying with a logical layer standard of the first standard when it is determined that the video terminal conversion adaptor is not connected; and the bias module configured to output a second signal complying with a physical layer standard of the second standard to the video output port complying with the first standard when the connection determination module determines that the video terminal conversion adaptor is connected, the second signal being converted from the first signal output from the image processing module by adjusting a bias voltage thereof.

2. The information processing apparatus of claim 1, further comprising:

a selection request image generating module configured to generate, when the connection determination module determines that the video terminal conversion adaptor is connected, an image for prompting the user to make a setting of whether the connected video terminal conversion adaptor is a first conversion adaptor or a second conversion adaptor; and a selection receiving module configured to receive the user's setting of whether the video terminal conversion adaptor is the first conversion adaptor or the second conversion adaptor, wherein the bias module outputs the second signal complying with the physical layer standard of the second standard being converted from the first signal output from the image processing module by adjusting the bias voltage thereof to the video output port complying with the first standard when the connection determination module determines that the video terminal conversion adaptor is connected and the selection receiving module receives the setting indicating that the video terminal conversion adaptor is the first conversion adaptor, and outputs the second signal output from the image processing module without changing information regarding the physical layer and the logical layer thereof to the video output port complying with the first standard when the connection determination module determines that the video terminal conversion adaptor is connected and the selection receiving module receives the setting indicating that the video terminal conversion adaptor is the second conversion adaptor.

3. The information processing apparatus of claim 2, wherein the first conversion adaptor has the video input terminal complying with the first standard and the video output terminal complying with the second standard, outputs the adaptor recognition signal through the video input terminal complying with the first standard, and outputs the second signal input through the video input terminal complying with the first standard, without changing information regarding the physical layer and the logical layer thereof, through the video output terminal complying with the second standard, and wherein the second conversion adaptor has the video input terminal complying with the first standard and the video output terminal complying with the second standard, outputs the adaptor recognition signal through the video input terminal complying with the first standard, and outputs a third signal complying with the physical layer standard of the second standard to the video output terminal complying with the second standard, the third signal complying with the physical layer standard of the second standard being converted from the second signal input through the video input terminal complying with the first standard by adjusting a voltage level thereof.

4. The information processing apparatus of claim 3, further comprising:

a display module configured to display the image for prompting the user to make the setting of whether the connected video terminal conversion adaptor is the first conversion adaptor or the second conversion adaptor; and an input module configured to receive the user's setting of whether the video terminal conversion adaptor is the first conversion adaptor or the second conversion adaptor.

5. The information processing apparatus of claim 1, further comprising:

an embedded controller configured to realize a function of the connection determination module.

6. The information processing apparatus of claim 1, wherein the first standard is a DisplayPort standard, and wherein the second standard is a High-Definition Multimedia Interface (HDMI) standard.

7. The information processing apparatus of claim 1, further comprising:

a logical protocol determination module configured to control the image processing module to output the first signal complying with the logical layer standard of the second standard when the connection determination module determines that the video terminal conversion adaptor is connected.

8. An information processing system comprising:

a video terminal conversion adaptor for connecting to a video output port of the information processing apparatus complying with a first standard and a video input port of an external device complying with a second standard, the video terminal conversion adaptor having a video input terminal complying with the first standard and a video output terminal complying with the second standard, the video terminal conversion adaptor outputting an adaptor recognition signal through video input terminal complying with the first standard; and an information processing apparatus comprising the video output port complying with the first standard for connecting with the video input terminal complying with the first standard of the video terminal conversion adaptor and capable of connecting with the video terminal conversion adaptor, the information processing apparatus further comprises:

a connection determination module configured to determine that the video terminal conversion adaptor is connected when receiving the adaptor recognition signal from the video terminal conversion adaptor through the video output terminal complying with the first standard;

an image processing module configured to (i) output a first signal complying with a logical layer standard of the second standard when the connection determination module determines that the video terminal conversion adaptor is connected, and (ii) output the first signal complying with a logical layer standard of the first standard when the video terminal conversion adaptor is not connected; and a bias module configured to receive the first signal and output a second signal, the second signal complying with a physical layer standard of the second standard to the video output port complying with the first standard when the connection determination module determines that the video terminal conversion adaptor is connected, the second signal being converted from the first signal output from the image processing module by adjusting a bias voltage thereof.

9. The information processing system of claim 8, further comprising:

a selection request image generating module configured to generate, when the connection determination module determines that the video terminal conversion adaptor is connected, an image for prompting the user to make a setting of whether the connected video terminal conversion adaptor is a first conversion adaptor or a second conversion adaptor; and a selection receiving module configured to receive the user's setting of whether the video terminal conversion adaptor is the first conversion adaptor or the second conversion adaptor, wherein the bias module outputs the second signal complying with the physical layer standard of the second standard being converted from the first signal output from the image processing module by adjusting the bias voltage thereof to the video output port complying with the first standard when the connection determination module determines that the video terminal conversion adaptor is connected and the selection receiving module receives the setting indicating that the video terminal conversion adaptor is the first conversion adaptor, and outputs the second signal output from the image processing module without changing information regarding the physical layer and the logical layer thereof to the video output port complying with the first standard when the connection determination module determines that the video terminal conversion adaptor is connected and the selection receiving module receives the setting indicating that the video terminal conversion adaptor is the second conversion adaptor.

10. The information processing system of claim 9,
wherein the first conversion adaptor is configured to
have the video input terminal complying with the first standard and the video output terminal complying with the second standard,
output the adaptor recognition signal through the video input terminal complying with the first standard, and
output the second signal input through the video input terminal complying with the first standard, without changing information regarding the physical layer and the logical layer thereof, through the video output terminal complying with the second standard, and
wherein the second conversion adaptor is configured to
have the video input terminal complying with the first standard and the video output terminal complying with the second standard,
output the adaptor recognition signal through the video input terminal complying with the first standard, and
output a third signal complying with the physical layer standard of the second standard to the video output terminal complying with the second standard, the third signal complying with the physical layer standard of the second standard being converted from the second signal input through the video input terminal complying with the first standard by adjusting a voltage level thereof.

11. The information processing system of claim 10,
wherein the information processing apparatus further comprises:
a display module configured to display the image for prompting the user to make the setting of whether the connected video terminal conversion adaptor is a first conversion adaptor or a second conversion adaptor; and
an input module configured to receive the user's setting of whether the video terminal conversion adaptor is the first conversion adaptor or the second conversion adaptor.

12. The information processing system of claim 8,
wherein the information processing apparatus further comprises:
an embedded controller configured to realize a function of the connection determination module.

13. The information processing system of claim 8,
wherein the first standard is a DisplayPort standard, and
wherein the second standard is one of a High-Definition Multimedia Interface (HDMI) standard and a Digital Visual Interface (DVI) standard.

14. The information processing system of claim 8,
wherein the information processing apparatus further comprises:
a logical protocol determination module configured to control the image processing module to output the first signal complying with the logical layer standard of the second standard when the connection determination module determines that the video terminal conversion adaptor is connected.

15. An information processing method for an information processing apparatus having a video output port complying with a first standard to be connected with a video terminal conversion adaptor for connecting the video output port complying with the first standard and a video input port of an external device complying with a second standard, the video terminal conversion adaptor having a video input terminal complying with the first standard and a video output terminal complying with the second standard, the video terminal conversion adaptor outputting the adaptor recognition signal through the video input terminal complying with the first standard, the information processing method comprising:
connecting the video terminal conversion adaptor to the information processing apparatus by connecting the video input terminal complying with the first standard of the video terminal conversion adaptor and the video output port complying with the first standard of the information processing apparatus;
determining that the video terminal conversion adaptor is connected to the video output port when receiving the adaptor recognition signal from the video terminal conversion adaptor through the video output port;
outputting a first signal to a bias module complying with a logical layer standard of the second standard when determining that the video terminal conversion adaptor is connected to the video output port, and outputting the first signal to the bias module complying with a logical layer standard of the first standard when determining that the video terminal conversion adaptor is not connected to the video output port; and
outputting a second signal complying with a physical layer standard of the second standard to the video output port complying with the first standard when determining that the video terminal conversion adaptor is connected so that the second signal complying with the logical layer standard of the second standard is output, the second signal complying with the physical layer standard of the second standard being output by adjusting a bias voltage of the signal complying with the logical layer standard of the second standard.

16. The information processing method of claim 15, further comprising:
generating, upon determining that the video terminal conversion adaptor is connected, an image for prompting the user to make a setting of whether the connected video terminal conversion adaptor is a first conversion adaptor or a second conversion adaptor; and
receiving the user's setting of whether the video terminal conversion adaptor is the first conversion adaptor or the second conversion adaptor,
wherein outputting the second signal complying with the physical layer standard of the second standard to the video output port complying with the first standard comprises
outputting the second signal complying with the physical layer standard of the second standard being converted from the first signal complying with the logical layer standard of the first standard by adjusting the bias voltage thereof to the video output port complying with the first standard when determining that the video terminal conversion adaptor is connected determines that the video terminal conversion adaptor is connected and the step of receiving the user's setting receives the setting indicating that the video terminal conversion adaptor is the first conversion adaptor, and outputting the second signal complying with the logical layer standard of the second standard without changing information regarding the physical layer thereof to the video output port complying with the first standard upon determining that the video terminal conversion adaptor is connected and the user's setting indicating that the video terminal conversion adaptor is the second conversion adaptor.

17. The information processing method of claim 15, wherein the first conversion adaptor has the video input terminal complying with the first standard and the video output terminal complying with the second standard, outputs the adaptor recognition signal through the video input terminal complying with the first standard, and outputs the second signal input through the video input terminal complying with the first standard, without changing information regarding the physical layer and the logical layer thereof, through the video output terminal complying with the second standard, and wherein the second conversion adaptor has the video input terminal complying with the first standard and the video output terminal complying with the second standard, outputs the adaptor recognition signal through the video input terminal complying with the first standard, and outputs a third signal complying with the physical layer standard of the second standard to the video output terminal complying with the second standard, the third signal complying with the physical layer standard of the second standard being converted from the second signal input through the video input terminal complying with the first standard by adjusting a voltage level thereof.

18. The information processing apparatus of claim 1, wherein the first standard is a DisplayPort standard, and wherein the second standard is a Digital Visual Interface (DVI) standard.

\* \* \* \* \*